Aug. 26, 1969

R. K. H. GEBEL 3,463,960

EYE PROTECTING ELECTRONIC VIEWER

Filed Jan. 3, 1968

INVENTOR.
R. K. H. GEBEL
BY Harry A. Herbert Jr
and
Robert Kern Duncan
ATTORNEYS

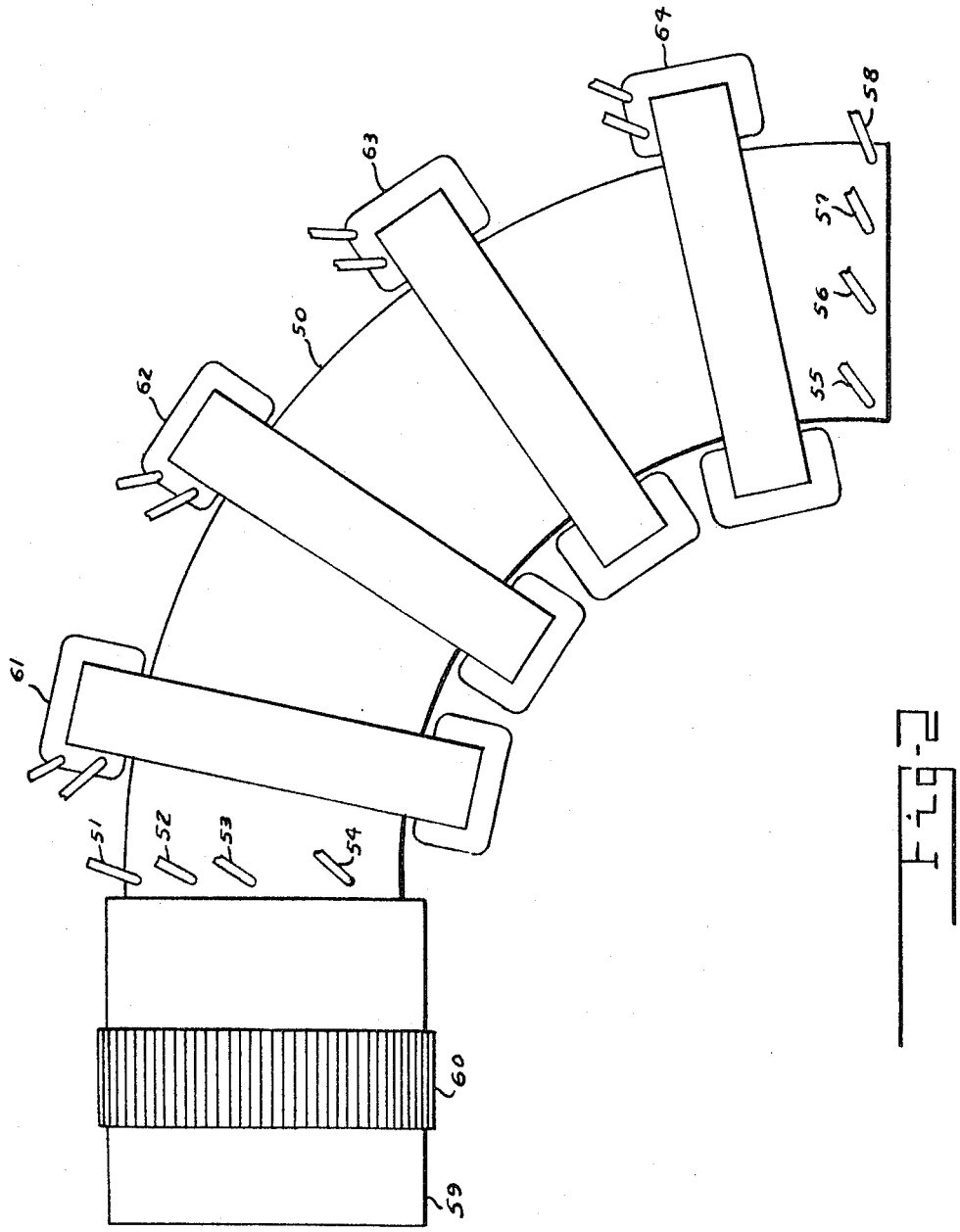

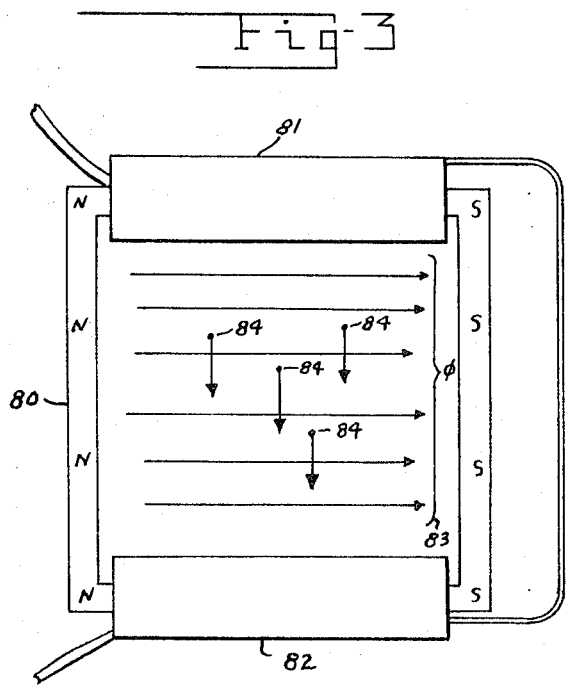

United States Patent Office 3,463,960
Patented Aug. 26, 1969

---

3,463,960
EYE PROTECTING ELECTRONIC VIEWER
Radames K. H. Gebel, Dayton, Ohio, assignor to the United States of America as represented by the Secretary of the Air Force
Filed Jan. 3, 1968, Ser. No. 695,394
Int. Cl. H01j 31/26
U.S. Cl. 315—10     2 Claims

---

ABSTRACT OF THE DISCLOSURE

An electronic right angle viewer that forms an electron image on the phosphor of a viewing screen that is located out of the direct line of observation.

---

Background of the invention

The field of the invention is in electron imaging devices.

The need frequently arises in which it is desirable to protect the physical well-being and particularly the eyes of an observer. The observation from the peripheral edge of rotating machinery that is in danger of disintegrating is one example; another is driving an armored car or tank in the face of small arms fire; and still another, and more recently recognized need for eye protection, is viewing in the presence of laser beams. The first two enumerated needs, but not the third, are frequently and often quite adequately met by the use of ordinary mirrors and prisms and more recently by the use of fiber optics. It is well recognized that a person may be permanently blinded by one glance into the beam of even a distant laser of moderate power.

Another prior art means in addition to the use of mirrors and prisms for removing the observer from the direct line of observation is accomplished through the use of a television pickup tube or camera, and a television viewing set, accompanied by all the necessary electronic circuitry. This system does protect the observer from the damaging effects of a laser beam, but it is a complex, bulky, elaborate, and expensive system.

Summary of the invention

An electronic imaging device that is simple, economical enough to be readily expendable, compact, light-weight, and that offers complete protection to the viewer is achieved by the novel simultaneous image forming apparatus in which the scene to be viewed is focused on a photocathode, and the emitted electrons are successively deflected and focused on a viewing phosphor that is not in a direct line with the viewing direction. The direction of view of the observer on the viewing screen may be at right angles to the line of the direction viewed, or by cascading the apparatus of the invention it may be parallel to, but not in line with the direction viewed. The device of this invention may be used in direct viewing, and photography. By cascading two or more of the devices various directions of observer viewing of the produced image may be obtained with respect to the viewed direction.

Brief description of the drawing

FIG. 2 is an exterior view of another embodiment of the invention;

FIG. 3 is a pictorial-schematic view of one of the deflection yokes of the embodiment of FIG. 2; and FIG. 4 is an illustrative pictorial view of a cascaded system utilizing the invention.

Description of the preferred embodiments

Figure 1:
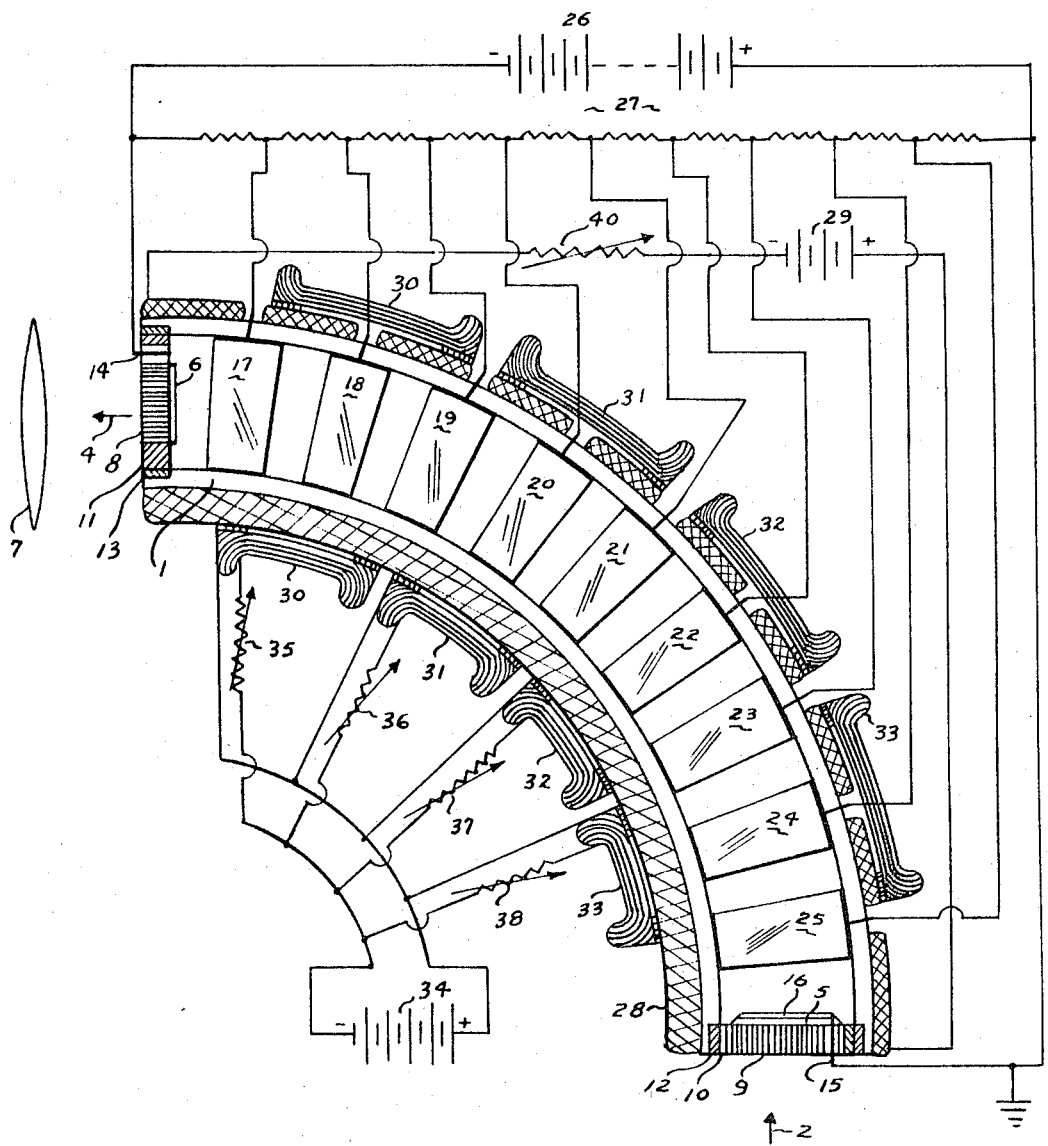
FIG. 1 is a pictorial-schematic representation of a sectional view of an embodiment of the invention taken in a plane that would contain the center line of the apparatus.

Referring to FIG. 1 a preferred embodiment of the invention comprises a cylindrical evacuated glass envelope or tube 1 formed into approximately a ninety degree arc so that the direction of viewing 2 by an observer's eye 3 is at a right angle and out of the direct line of the direction viewed 4. Thus, if the device is trained on a laser beam the observer may see a flash of light in the reproduced scene on the phosphor 5, at the point in the scene at which the laser is located but his eyes are protected. A strong laser beam may burn the photocathode 6 or even pass straight on through the device destroying it, but due to the inherent limitations of the device the laser beam will not be reproduced or transmitted to the observer.

In operation an image of the scene is focused on the outside surface of the fiber optics 8 by the lens 7. This optical image is then conducted by the fiber optics to the photocathode deposited on its inside surface. It is to be understood that while a single convex lens is shown that multiple lens systems, as are well known in the art, may be used to bring the image in focus. In a typical embodiment using a 50 mm. focal length lens the field of view is approximately eleven degrees. For general usage this is considered the preferred lens. If the device is used primarily for long-range viewing a 100 mm. focal length system may be used with a resulting field of view of approximately five degrees.

The preferred embodiment has fiber optics 8 at the light input area and 9 at the light output area. The use of fiber optics is desirable so that the device may be cascaded with additional similar or identical structures. Thus, when two of these devices are cascaded, with the input to the second at the output of the first, the observer is given 360 degrees of freedom in his viewing position. Thus an observer may use two of the devices, in cascade in a manner similar to a periscope. If the device is not to be cascaded the fiber optics may be replaced with conventional glass faces with the photocathode on the inside surface of the light input end and the phosphor on the inside surface of the light output end. Due to halo effects occurring around imperfections in the glass surfaces they are not as suitable for cascading as are the fiber optic surfaces. While speaking of surfaces at the input and output, it is to be understood that the fiber optics composing the input and output face plates in the preferred embodiment are essentially cylindrical fiber bundles composed of ten to fifteen micron fibers approximately 0.2 inch long. Due to the cosine function of emitted electrons in response to the optical illumination it is desirable that the photocathode 6 and scene entrance diameter be not larger than approximately one-half the inside diameter of the glass tube 1. In the preferred embodiment being described the diameter of the photocathode is approximately one-half an inch and the inside diameter of the tube is approximately one inch. The mean length of this particular preferred embodiment from photocathode the phosphor is approximately 7 inches. The phosphor 5 and fiber optics image exit aperture 9 may be as large as mechanical considerations will permit.

The impinging electron stream produces the optical image in the phosphor which is deposited on the inside surface of the fiber optic bundle. The fiber optic bundle then conducts the optical image to the outside surface 9 where the image may be viewed, photographed, or otherwise utilized.

The fiber optic bundles are encased in metallic rings 10 and 11 which are sealed with the metallic rings 12 and 13 which are embedded in the glass envelope. The electrical connector 14 to the photocathode 6 and 15 to the aluminized phosphor may be insulated from the metallic rings, as shown, or the rings themselves may be used to make contact with the photocathode and aluminized phosphor.

In the specific embodiment being described which may be considered optimum for general usage an S–20 photocathode 6 is used. The thickness is approximately 500 angstroms. The phosphor 5 is a P–4 phosphor approximately 20 microns thick with an aluminized coating 16 approximately 50 millimicrons thick. The use of aluminized coatings over viewing phosphors to enhance the light output and decrease internal radiation is well known in the art. It is to be nuderstood that these enumerated cathodes and phosphors are considered best for general usage. Cathodes and phosphors having other spectral characteristics may readily be used. For instance, for primarily nighttime usage an S–1 photocathode may be used, or for daytime usage S–9, S–10, or S–17 photocathodes may be preferred. Those skilled in the art will readily comprehend the specific advantages that may be obtained by use of various well-known materials. Likewise a P–1 phosphor may be used instead of a P–4. When this invention is used with photocathodes primarily responsive in the red and infrared spectral region it could be considered as having image converter characteristics. A method of making an optical fiber phosphor screen is disclosed in U.S. Patent No. 3,291,706. Other means of depositing the cathode material and the viewing phosphor on the fiber optic bundles are well known in the art.

An electrostatic electron accelerating field is created within the tube by charged electrode rings 17 through 25 which are uniformly positioned along the inside surface of the tube. An accelerating potential 26 is uniformly distributed by the voltage divider 27 to these electrodes creating an electrostatic field gradient from the photocathode to the phosphor. Sometimes it has been found that a slight improvement in the resolution obtained by the device may be obtained if a slight departure from a uniform voltage distribution is used to correct for imperfections and lack of uniformity in other parts of the electron control field. Ten thousand volts supplied by potential source 26 has been found to be preferred in this specific embodiment. Higher voltages may be used, however, with voltages over approximately 16 kv. some form of "gettering" is required due to the inability of conventional vacuum pumps to draw a sufficiently hard enough vacuum within the sealed evacuated electron tube structure. Ohmic values of from fifty to one hundred megohms have been found very satisfactory for the total resistance of the divider for this embodiment.

Focus coil 28, wound in solenoid manner around the tube, provides a magnetic focusing field for bringing the emitted electrons from the photocathode 6 to a focus on the phosphor 5. In this embodiment three loops in the electron helix are formed between the cathode and the phosphor. This requires a magnetic focusing field throughout the length of the tube having a field intensity of approximately 170 gauss. This is supplied by the focus coil of approximately twenty thousand turns of number 32 enamelled wire, carrying a current of approximately 130 milliamperes. This requires approximately 156 volts across the coil which is supplied by source potential 29 and current regulating resistance 40. Fewer than 3 turns in the electron helix may be used with resulting lower focusing power requirements. However, with the lower values of focusing field strength the effects of the earth's magnetic field may become appreciable and compensating means may have to be used. It has been found desirable to extend the ends of the focus coil to the ends of the tube, as shown in the drawing, in order to have a uniform field from the cathode to the phosphor.

The deflection of the emitted electrons through the approximately 90 degree arc from the photocathode to the view phosphor is accomplished by the deflection coils 30 through 33. It is to be understood that similar coils would be similarly positioned on the half of the tube that has been cut away in this sectional view. The half of each pair of coils, not shown, are series connected with their respective half of the pair. These deflecting coil pairs created a magnetic field perpendicular to the electron beam. Looking down on the drawing held horizontally the magnetic field lines would be vertical into and out of the paper. The deflection coils are made a loose fit over the focus coil so that a small amount of rotation is possible which permits slight adjustments to be made in properly aligning each magnetic deflection field. The energy to create the fields is supplied by potential source 34. Variable resistors 35 through 38 regulate the current to the amount to produce the required deflection field strengths. To reduce the current requirements in the deflecting coils it is conventional practice to introduce iron into the flux return path that lies outside the tube. For this purpose iron wire may be wrapped around each pair of deflecting coils.

While four pairs of deflecting coils are used in this embodiment it is tobe understood that in many instances it may be desirable to create the required 90 degree deflection of the electron stream with smaller individual deflection angles and to use more deflection fields. Many possible deflecting coil configurations may be used as is well known in the art. Reference is made to Volume 22 of the Radiation Laboratory Series published by McGraw-Hill, entitled "Cathode Ray Tube Displays" and particularly Chapter 8 of the book, where design formulas and criteria are given.

The magnetic fields, both focusing and deflection, are steady state fields, i.e., there is no sweep of the electron beam, as is employed for instance in television usage; thus, permanent magnet field generating means may readily be substituted by those skilled in the art in place of the electromagnetic field generating means shown.

In FIG. 2 is shown a slightly different embodiment of the invention. In this embodiment the focusing coil 50 is spaced away from the glass tube and the electrical leads 51 through 58, to the connections to the accelerating electrodes are brought out at the ends of the device and run within this space between the outside of the glass tube and the inside of the focusing coil. This embodiment while being slightly more bulky than that of FIG. 1, has the advantage of having a uniform focusing coil from one end of the tube to the other without any openings necessary in which to make connections to the accelerating electrodes. It is desirable to fill the remaining space between the inside of the focus coil and the glas tube with a suitable potting compound. Such compounds are well known in the art.

In this embodiment shown in FIG. 2 the glass tube, the accelerating electrodes, the fiber optics, the photocathode and the viewing phosphor are essentially the same as shown in FIG. 1. The optical structure 59 containing the lens system for optically focusing the scene to be viewed on the face of the fiber optics has a rotatable knurled ring 60 which is manually turned to adjust the lens system to bring the scene into focus.

The deflection yokes 61 through 64 are shown in detail in FIG. 3. A stack of silicon iron laminations 80 having a cross section of approximately ³⁄₁₆ inch by ⁹⁄₁₆ inch is magnetized as shown by series connected coils 81 and 82. These coils and the iron magnetic structure create a magnetic flux field 83 which deflects the electrons 84 coming up out of the plane of the drawing in a downward direction as shown by the arrows. In this specific illustrative embodiment each deflecting coil (81 and 82) of each yoke has approximately 7000 turns of number 34 wire. The required electron deflection of approximately 22.5 degrees per deflection yoke is obtained with approximately fifty-four volts across each deflection yoke.

FIG. 4 shows pictorially the use of two of the devices of this invention in cascade. Separate power sources and controls 90 and 91 are shown for each device. One energy source may be used that is provided with separate controls for each device. Since the scene at the output of the first device 92 is in focus no additional lens system is needed at the input to the second device 93. The image in this instance is transferred from the phosphor of the first device to the photocathode of the second device by the two sets of fiber optics.

While it is shown in the figure that the eye 94 views the scene directly on the phosphor through the fiber optics it is to be understood that a lens system may also be used between the eyes of the observer and the output of the device to further magnify the image produced.

What is claimed is:

1. An eye protecting electronic viewer for safely viewing with high resolution in the visible light spectrum, in the presence of eye damaging laser beams, comprising:
   (a) a first, essentially cylindrical, fiber optic bundle having an outside surface and an inside surface for conducting an optical image in the visible light spectrum;
   (b) a second, essentially cylindrical, fiber optic bundle of essentially the same diameter as the first fiber optic bundle, having an inside surface and an outside surface for conducting an optical image in the visible light spectrum;
   (c) a cylindrical glass tube having an inside diameter at least twice the diameter of each of the said fiber optic bundles, formed in approximately a ninety degree arc, cooperating in sealing relationship means at one end with the first fiber optic bundle and at the other end with the second fiber optic bundle to provide an evacuated electron tube;
   (d) means, including a photocathode deposited on the inside surface of the first fiber optic bundle, for emitting electrons responsive to light in the visible light spectrum;
   (e) means responsive to the emitted electrons for providing a visible optical image including an aluminized phosphor deposited on the inside surface of the second fiber optic bundle;
   (f) means, including a plurality of annular electrode rings uniformly positioned in spaced apart relationship along the inside surface of the tube, for providing an electrostatic electron accelerating field within the tube;
   (g) magnetic focusing means including a uniformly distributed solenoid coil around the tube and extending the length of the tube;
   (h) magnetic electron deflection means, including a plurality of at least four pairs of magnetic field generating coils with each pair of coils having independent magnetic field control means, uniformly positioned over the said solenoid coil of the said focusing means, for deflecting the electrons through the said approximately ninety degree arc of the electron tube; and
   (i) means including an optical lens for focusing an optical image on the outside surface of the first fiber optic bundle.

2. An eye protecting variable direction electronic viewer for safely viewing with high resolution in the presence of eye damaging laser beams comprising:
   (a) a first and a second electronic imaging means each having, essentially identical,
      (1) a first, essentially cylindrical fiber optic bundle having an outside surface and an inside surface for conducting an optical image;
      (2) a second, essentially cylindrical fiber optic bundle of essentially the same diameter as the first fiber optic bundle, having an inside surface and an outside surface for conducting an optical image;
      (3) a cylindrical glass tube having an inside diameter at least twice the diameter of each of the said fiber optic bundles, formed in approximately a ninety degree arc, cooperating in sealing relationship means at one end with the first fiber optic bundle and at the other end with the second fiber optic bundle to provide an evacuated electron tube;
      (4) means, including a photocathode deposited on the inside surface of the first fiber optic bundle, for emitting electrons responsive to light;
      (5) means responsive to the emitted electrons for providing a visible optical image including an aluminized phosphor deposited on the inside surface of the second fiber optic bundle;
      (6) means, including a plurality of annular electrode rings uniformly positioned in spaced apart relationship along the inside surface of the tube, for providing an electrostatic electron accelerating field within the tube;
      (7) magnetic focusing means including a uniformly distributed solenoid coil around the tube and extending the length of the tube;
      (8) magnetic electron deflection means, including a plurality of at least four pairs of magnetic field generating coils with each pair of coils having independent magnetic field control means, uniformly positioned over the said solenoid coil of the said focusing means, for deflecting the electrons through the said approximately ninety degree arc of the electron tube;
   (b) means for rotatably positioning the said first electronic imaging means with respect to the said second electronic imaging means with the outside surface of the second fiber optic bundle of the first imaging means juxtapositioned the outside surface of the first optic bundle of the second electronic imaging means; and
   (c) means including an optical lens for focusing an optical image on the outside surface of the first fiber optic bundle of the first imaging means.

References Cited

UNITED STATES PATENTS

| | | | |
|---|---|---|---|
| 2,739,244 | 3/1956 | Sheldon | 250—213 |
| 3,141,105 | 7/1964 | Courtney-Pratt | 250—213 X |
| 3,356,851 | 12/1967 | Carlson | 250—213 |
| 3,369,125 | 2/1968 | Dueker | 250—213 |

RODNEY D. BENNETT, Jr., Primary Examiner

JEFFREY P. MORRIS, Assistant Examiner

U.S. Cl. X.R.

250—213, 217